(12) United States Patent
Reid et al.

(10) Patent No.: US 6,330,325 B1
(45) Date of Patent: Dec. 11, 2001

(54) AUTOMATIC LOG-OFF SIGNALING FOR TELEPHONE SYSTEMS

(75) Inventors: Kirk A. Reid; Dwight D. Lynn, both of Santa Cruz, CA (US)

(73) Assignee: GN Netcom, Inc., Nashua, NH (US)

( * ) Notice: Subject to any disclaimer, the term of this patent is extended or adjusted under 35 U.S.C. 154(b) by 0 days.

(21) Appl. No.: 09/052,035

(22) Filed: Mar. 30, 1998

Related U.S. Application Data

(60) Provisional application No. 60/042,213, filed on Mar. 31, 1997.

(51) Int. Cl.[7] .................................................. H04M 1/00
(52) U.S. Cl. ............................. 379/265.01; 309/214.01; 309/267; 309/387
(58) Field of Search .................................. 379/309, 395, 379/365, 214, 387, 265, 266, 267

(56) References Cited

U.S. PATENT DOCUMENTS

| | | | |
|---|---|---|---|
| 3,571,518 | 3/1971 | Chipman et al. | 179/27 |
| 3,851,111 | 11/1974 | Young | 179/51 R |
| 4,048,452 | 9/1977 | Oehring et al. | 179/27 D |
| 4,197,430 | 4/1980 | Dowden | 179/27 D |
| 4,400,587 | 8/1983 | Taylor et al. | 179/27 D |
| 4,449,017 | 5/1984 | Burke et al. | 179/27 D |
| 4,450,319 | 5/1984 | Lucey | 179/2 EA |
| 4,484,029 | 11/1984 | Kenney | 179/2 EA |
| 4,499,337 | 2/1985 | Elbaek | 179/27 D |
| 4,562,310 | 12/1985 | Watters et al. | 179/100 R |
| 4,620,066 | 10/1986 | Bushnell et al. | 179/27 D |
| 4,672,663 | 6/1987 | Tomasi | 379/388 |
| 4,682,354 | 7/1987 | Vanacore | 379/211 |
| 4,882,745 | 11/1989 | Silver | 379/61 |
| 4,951,310 | 8/1990 | Honda et al. | 379/266 |
| 4,974,251 | 11/1990 | Ohta et al. | 379/61 |
| 5,062,103 | 10/1991 | Davidson et al. | 370/58.1 |
| 5,073,890 | 12/1991 | Danielsen | 370/58.2 |
| 5,113,428 | 5/1992 | Fitzgerald | 379/61 |
| 5,226,077 | 7/1993 | Lynn et al. | 379/395 |
| 5,280,541 | 1/1994 | Marko et al. | 379/61 |
| 5,396,551 | * 3/1995 | Lucey | 379/395 |
| 5,488,657 | 1/1996 | Lynn et al. | 379/395 |
| 5,623,544 | * 4/1997 | Papadopoulos | 379/395 |
| 5,805,695 | * 9/1998 | Bosley | 379/395 |
| 5,913,163 | * 6/1999 | Johansson | 455/426 |
| 5,923,747 | * 7/1999 | Van Berkum et al. | 379/265 |
| 5,946,392 | * 8/1999 | Tague | 379/395 |
| 5,982,879 | * 11/1999 | Lucey | 379/309 |
| 5,991,645 | * 11/1999 | Yuen et al. | 455/568 |

OTHER PUBLICATIONS

Newton's Telecom Dictionary (Harry Newton, Jan. 1998).*

* cited by examiner

Primary Examiner—Ahmad Matar
Assistant Examiner—William J. Deane, Jr.
(74) Attorney, Agent, or Firm—Stallman & Pollock LLP

(57) ABSTRACT

A telephone agent availability monitoring system is disclosed for use in telephone switching networks known as "automatic call distribution" systems (ACD's). The inventive monitoring system automatically detects when a telephone headset is unplugged from its associated amplifier, and sends a signal via the agent's computer work station to a central server connected with telephone switching equipment. In the case of a wireless headset, a signal is sent when the headset travels out of communication range. The telephone switching equipment can then route an ongoing call and/or future calls to other agents who are available, until the monitoring system detects that the headset has been plugged back into the amplifier or traveled back into range, indicating that the agent is available again.

7 Claims, 2 Drawing Sheets

AUTOMATIC LOG-OFF SIGNALING FOR TELEPHONE SYSTEMS

This application claims the benefits of U.S. Provision Application No. 60/042,213, filed Mar. 31, 1997, and entitled AUTOMATIC LOG-OFF SIGNALING FOR TELEPHONE SYSTEMS, incorporated herein by reference.

BACKGROUND OF THE INVENTION

U.S. Pat. No. 5,226,077, issued Jul. 6, 1993, describes a headset amplifier with automatic log-on and log-off detection. The disclosure in U.S. Pat. No. 5,226,077 ('077 Patent) is incorporated herein by reference.

As described in the '077 Patent, a number of manufacturers have developed sophisticated telephone switching networks called "automatic call distribution" systems or ACDs. These systems are used in call centers such as for airline reservations, banks, telemarketing, etc., for receiving a large number of calls from the outside and distributing them to various operators at the call center. The operators in call centers typically use telephone headsets that are connected to the ACD through an amplifier module. In many current headset systems, the amplifier is detachably connected to either the ACD or to a telephone set which is, in turn, connected to the ACD. The headset is detachably connected to the amplifier via a wire that includes a "quick disconnect" element. When the operator goes on a break, she will use the quick disconnect to separate the headset from the amplifier, allowing her to walk away from the station while continuing to wear the headset. Headsets are typically not shared among operators for sanitary reasons.

Some of the more sophisticated ACD/telephone systems include a mechanism for detecting when the amplifier has been disconnected from the system. The detection system permits the ACD to determine whether the operator is available to take a call. Unfortunately, currently designed detection circuits are unable to determine when the operator has unplugged the headset from the amplifier and left the station.

This problem was overcome by the invention described in the aforementioned '077 Patent. The '077 Patent described a system wherein the amplifier was capable of monitoring when the headset became disconnected from the amplifier. Upon detection of that disconnection, the amplifier functioned to "emulate" the disconnection of the amplifier from the telephone switch, even though the amplifier remained connected. This emulation function allows the ACD to determine when the headset had been disconnected from the amplifier and the operator was unavailable.

Further refinements of this system are disclosed in U.S. patent application Ser. No. 08/469,481 ('481 Application), filed Jun. 6, 1995, also incorporated by reference. This disclosure describes an approach which is desirable where wireless headsets are used. In a wireless headset, there is no hardwire connection between the amplifier and the headset. As long as the headset remains within range of the amplifier base, communications can proceed. If, however, the operator moves beyond the range of transmission, the call cannot be continued. In accordance with the '481 Application, the amplifier is provided with a circuit for determining when the headset has gone out of range. When the headset goes out of range, the amplifier functions to emulate the disconnection of the amplifier from the switch even though the amplifier remains connected.

The emulation function used by the amplifier is based upon the protocol which is being monitored by the ACD. For example, the ACD can be designed to look for a change in either the current or resistance at the amplifier connection. These emulation functions are performed for both the hardwired or wireless embodiments.

There are a number of existing telephone switches (ACDs) which are not provided with automatic log-off sensing features. Amplifiers capable of emulating the disconnection of the amplifier from the switch are therefore not useful in these systems since the switch does not provide any means for detecting that disconnection. For many manufacturers, the cost for redesigning switches and telephones to provide this detection capability is not feasible. The object of the subject invention is to provide a novel approach for signalling the availability of the operator in systems which do not have any detection capability designed into the telephone or the switch.

SUMMARY OF THE INVENTION

In today's telecommunications marketplace, there is a rapid evolution for linking computer systems with the telephone. The computer system adds a great amount of sophisticated intelligence to the telephone network. In many call centers, the telephone agents or representatives work in front of computer work stations that are linked together by a data network. The present invention utilizes this existing equipment to signal the telephone system as to the availability of each of the telephone agents.

DETAILED DESCRIPTION OF THE PREFERRED EMBODIMENTS

Figure 1:
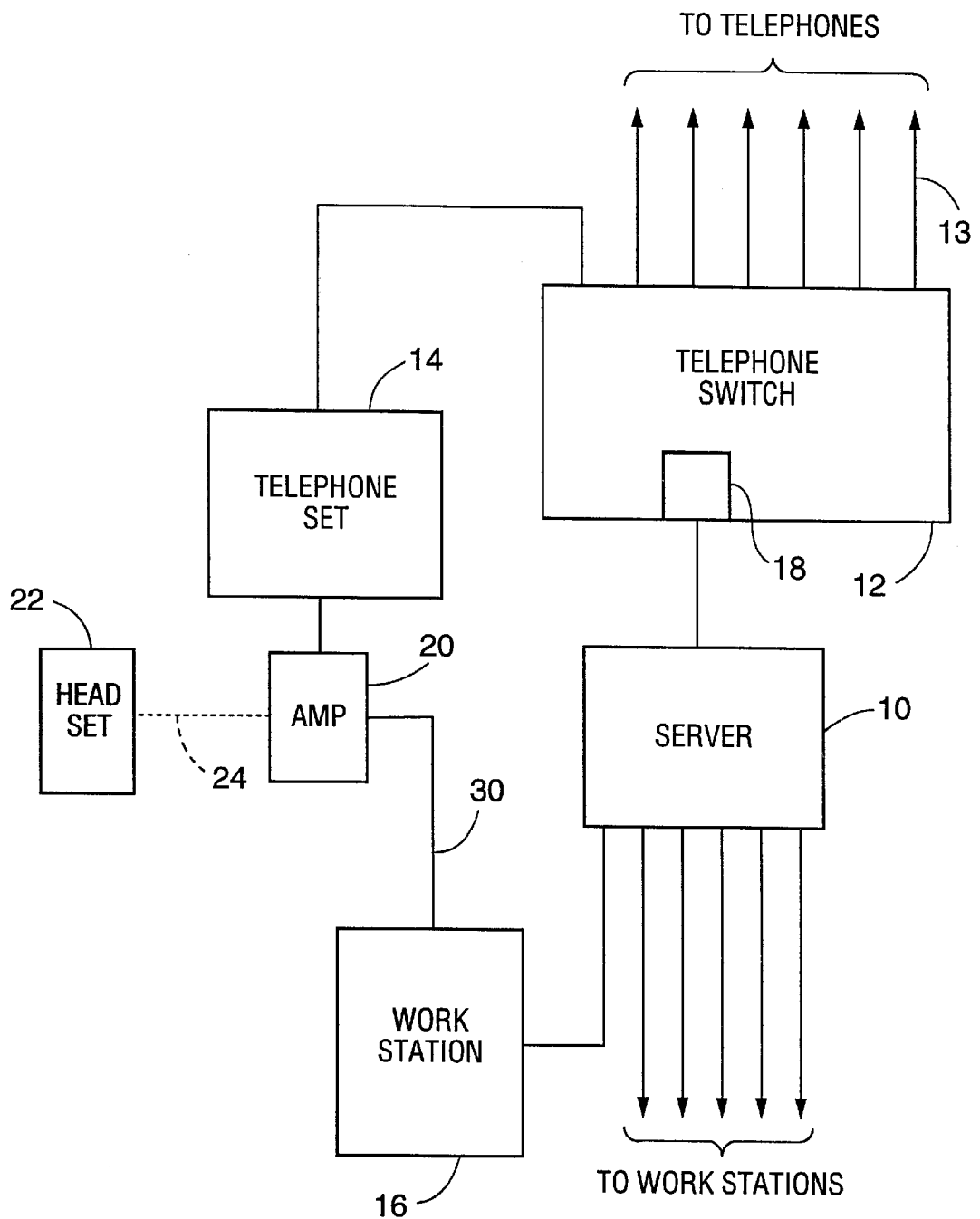
FIG. 1 shows a schematic representation of a telephone system constructed according to the present invention.

Referring to FIG. 1, a computer server 10 can be connected to a conventional telephone switch 12. The telephone switch 12 includes lines 13 to numerous telephones such as telephone set 14. Server 10, in turn, is connected to a large number of work stations 16 through network software. A telephone switch controller 18 can be located in telephone switch 12, in server 10, or in another piece of equipment, for controlling the routing functions of switch 12.

A number of vendors have developed software for interfacing between servers, work stations and telephone switches. The software packages include Microsoft's TAPI (Telephone API) and Novell's TSAPI (Telephone Services Application Program Interface). In Europe, a further standard CSTA, is provided. Attached as an appendix to the above-identified provisional application are written descriptions of some of these software packages. The subject invention could be developed with any of these software interfaces.

As shown in FIG. 1, the telephone set is connected to an amplifier 20. The amplifier, in turn, is connected or linked to a headset 22. This connection or link 24 can either be hardwired or wireless.

In accordance with the subject invention, when the link between the headset and the amplifier is broken, a detector circuit 25 within amplifier 20 will detect that disconnection. Where the connection is hardwired, the amplifier detector circuit 25 might function to measure a change in resistances as disclosed in U.S. Pat. No. 5,226,077. Alternatively, where the connection between the headset and the amplifier is a wireless type connection, other detection schemes can be used. For example, and as is described in U.S. patent application Ser. No. 08/469,481, the detector 25 can measure when the transmission signal drops below a certain level. Alternatively, various handshaking routines between the amplifier and the headset can be used to determine if the headset is within range. The scope of the subject invention is intended to include a wide range of detection schemes for determining when the communication link between the headset and the amplifier has been changed, either interrupted or reconnected.

In accordance with the subject invention, a data link 30 is provided between the amplifier and the work station 16. Any standard linking mechanism found between a conventional peripheral and a computer work station could be used. Examples of such links include a serial or parallel connection or a link via a keyboard. Link 30 can be an infrared link. Link 30 is used to deliver a signal from the amplifier to the work station, wherein the signal is generated by the amplifier in response to the change of status of the communication link between the amplifier and the headset. Thus, unlike the prior system described in the U.S. Pat. No. 5,226,077, which emulates the disconnection of the amplifier from the switch, the signal generated in this embodiment is in the nature of a computer flag or interrupt which can be acted upon by the software in either the work station 16 or the server 10. The software can be programmed to respond to the signaled change in the communication link between the headset and the amplifier. The response can be similar to that provided in the prior systems which directly detected the disconnection or reconnection of the headset or amplifier. For example, if a break in the communication link between the headset and the amplifier is detected, the system software on the server can modify the operation of the switch so that no further calls are routed to the work station. Further, if a call was in progress, the server can put that call on hold and possibly route the call to another operator to continue the conversation so the call is not lost. When the headset is reconnected to the amplifier (or comes back into operating range in a wireless embodiment), the amplifier can detect the reconnection and supply a signal to the work station. The server can then begin routing new calls to the work station.

The important aspect to be recognized with this invention is that operator availability can now be monitored with existing telephone equipment which has not been provided with dedicated detection hardware. The capability of monitoring operator availability can be added without redesigning all the telephone set and switch hardware and firmware to monitor the connection status. Rather, the only hardware change necessary is to provide an extremely simple electrical connection between the amplifier and the work station. The remaining changes necessary to implement this proposal can be handled through minor revisions to the various telephone interface software packages running in the work station, server and switch. Thus, the unique capability of detecting an operator not available situation can be created with changes to a software package that can be implemented across the entire customer base without ever modifying the telephones and telephone switches.

Figure 2:
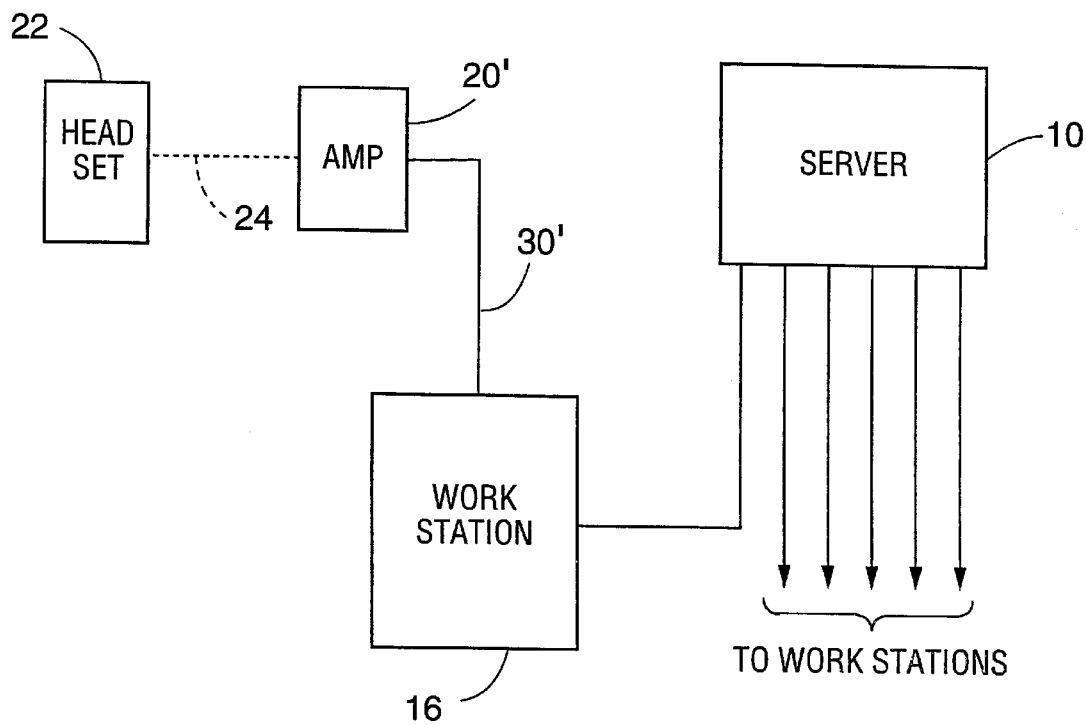
FIG. 2 shows a schematic representation of a second embodiment of the invention.

Referring to FIG. 2, a second embodiment is shown. This embodiment is similar to the first embodiment shown in FIG. 1, but here the telephone call voice signals are carried by the work station/server network rather than through a telephone set 14. Combined telephony and data networks are becoming more common and are well known in the art today. Preferably, amplifier 20' with included detector 25' is designed to comply with the Universal Serial Pus (USB) standard, and plugs into a USB port on work station 16 with link 30'. In other words, both voice signals (the telephone call) and data signals (agent not available signals) would be carried by link 30' between amplifier 20' and work station 16. Work station 16 would be used to send and/or receive telephone calls in place of telephone set 14. In all other respects, the second embodiment works in the same way as the first.

Figure 3:
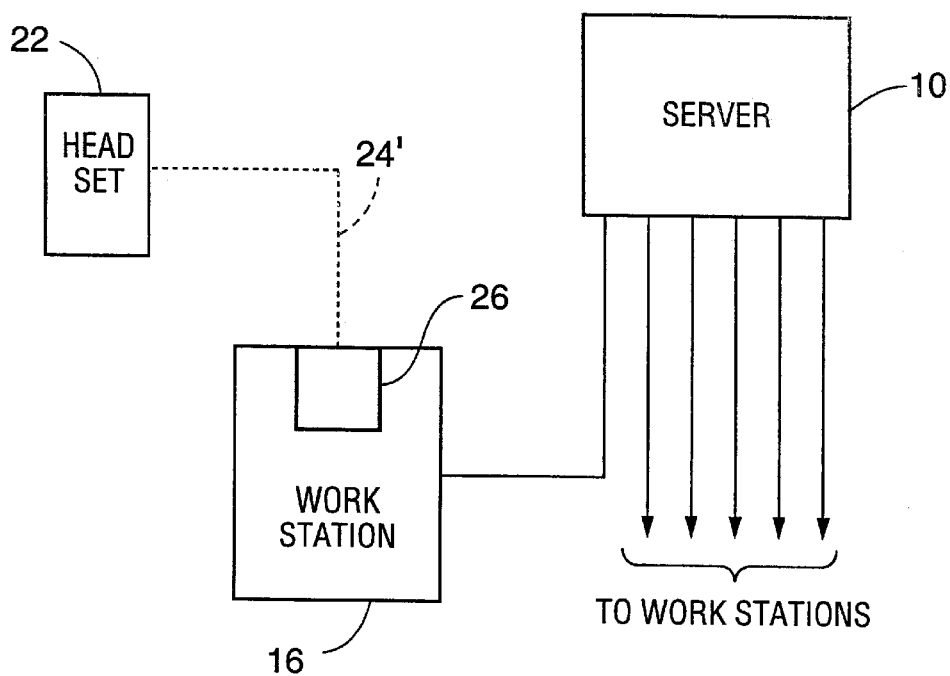
FIG. 3 shows a schematic representation of a third embodiment of the invention.

Referring to FIG. 3, a third embodiment is shown. This embodiment is similar to the second embodiment shown in FIG. 2, but utilizes an "expansion slot" type card 26 to serve the function of an amplifier and an interface to the local bus of the work station 16. Card 26 would essentially be a "sound card" modified to detect the presence of headset 22 on the card's microphone input as previously described. When designed for use with a wireless headset, card 26 would also contain the necessary transceiver circuits.

The above descriptions and attached drawings are for illustrative purposes only. It is to be understood that the present invention is not limited to the sole embodiments described above and illustrated herein, but encompasses any and all variations falling within the scope of the appended claims.

What is claimed as the invention is:

1. A telephone call distribution network for routing incoming calls to one of a group of operators comprising;
    a plurality of computer workstations;
    a headset associated with each computer workstation for use by an operator;
    an amplifier connected between each headset and the associated computer workstation and wherein the computer workstations have no circuitry for independently detecting when the connection between the amplifier and the workstation has been interrupted;
    a controller for routing incoming calls to an available operator; and
    circuitry associated with the amplifier for detecting when the connection between the headset and the amplifier has been interrupted and for generating a data signal in response thereto which is supplied to the workstation and wherein one of the workstation and the controller includes software for interpreting the data signal as an indication that the operator is unavailable so that incoming calls will not be routed to that operator.

2. A network as recited in claim 1, wherein the connection between the amplifier and the workstation carries both voice signals and data signals.

3. A network as recited in claim 1, further including a telephone set connected between the amplifier and the controller and wherein the connection between the amplifier and the telephone set carries voice signals therebetween.

4. A network as recited in claim 1, wherein the functions of the controller are performed by a computer server and a telephone switch.

5. A network as recited in claim 1, wherein the circuitry additionally detects when the connection between the headset and the amplifier has been reestablished and generates a second data signal in response thereto which is supplied to the workstation and wherein the software interprets the second data signal as an indication that the operator is now available so that incoming calls can be routed to that operator.

6. The network as recited in claim 1, wherein the connection between the amplifier and the headset is defined by an electrical cable, said cable having a connector therein to allow the headset to be disconnected from the amplifier.

7. The network as recited in claim 1, wherein the connection between the amplifier and the headset is defined by a wireless link created by radio transceivers located in the headset and the amplifier.

* * * * *